Figure 2:
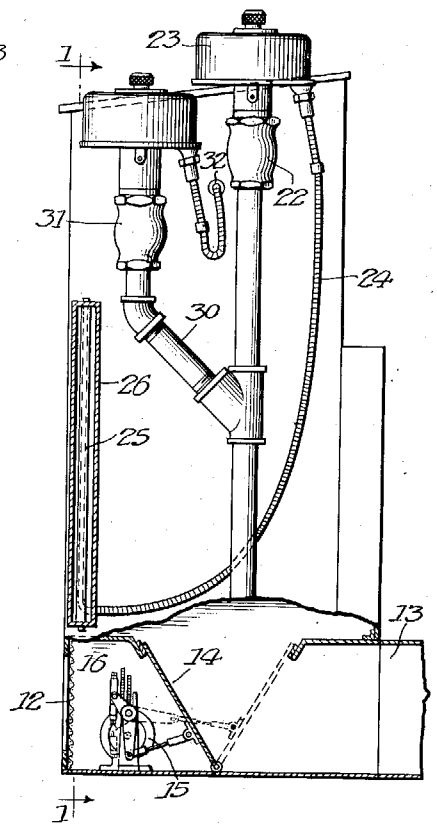

July 12, 1932. M. O. SNEDIKER Re. 18,528

HEATING AND VENTILATING UNIT

Original Filed May 5, 1930

Witness
R. B. Davison.

Inventor
Morton O. Snediker.
By Murray & Murray
Attys.

REISSUED

Reissued July 12, 1932

Re. 18,528

UNITED STATES PATENT OFFICE

MORTON O. SNEDIKER, OF CHICAGO, ILLINOIS, ASSIGNOR TO THE POWERS REGULATOR COMPANY, OF CHICAGO, ILLINOIS, A CORPORATION OF ILLINOIS

HEATING AND VENTILATING UNIT

Original No. 1,813,261, dated July 7, 1931, Serial No. 449,947, filed May 5, 1930. Application for reissue filed March 30, 1932. Serial No. 602,072.

My invention relates to heating and ventilating devices and particularly to a construction similar to that of my co-pending application, Serial No. 449,946 filed May 5, 1930.

In the disclosure of the application above identified there is found a device consisting of a cabinet containing a heat exchange element and a blower, together with thermostatic means for regulating the admission of air either from the inside or outside, and the tempering of the air according to a desired room temperature.

Under normal conditions a device such as described will operate satisfactorily but will not be without fault when an unusual temperature condition arises. For example, when the outside temperature is comparatively mild, and when the room that is to be heated is at or above the predetermined desirable temperature, due to the presence of a large number of persons, or to the admission of heat through extraneous sources such as uninsulated risers, etc., the supply of heat to the casing radiator will be shut off and the controlling damper will be set to admit air from the outside. The entering air will be relatively cold, and, immediately upon being discharged from the casing under the action of the fan, will drop to the floor and cause a drafty condition. Particularly is this true as to persons who may be sitting adjacent to the ventilating unit, the cold air falling on their heads.

To avoid this condition, I have provided an adjunct to the apparatus, described in my copending application referred to, consisting of a second heat exchange element independently controlled and preferably located vertically beneath the main heat exchange element. The controlling valve for the lower heat exchange element or radiator is actuated by a self-contained thermostatic device, the thermosensitive part of which is placed immediately above the lower radiator and between the two radiators. This thermostat is set for a somewhat lower temperature than the thermostat that controls the main radiator. Thus in the event of a condition such as heretofore described, the entering air is not permitted to pass into the room in a cold condition.

The auxiliary radiator will also function under normal operating conditions so long as the air passing upward into contact with the main radiator is below the predetermined temperature for which the lower thermostat is set. Such radiator will therefore act as an auxiliary to the main radiator under normal operating conditions, so long as the air withdrawn from the outside is below a certain temperature.

Figure 1:
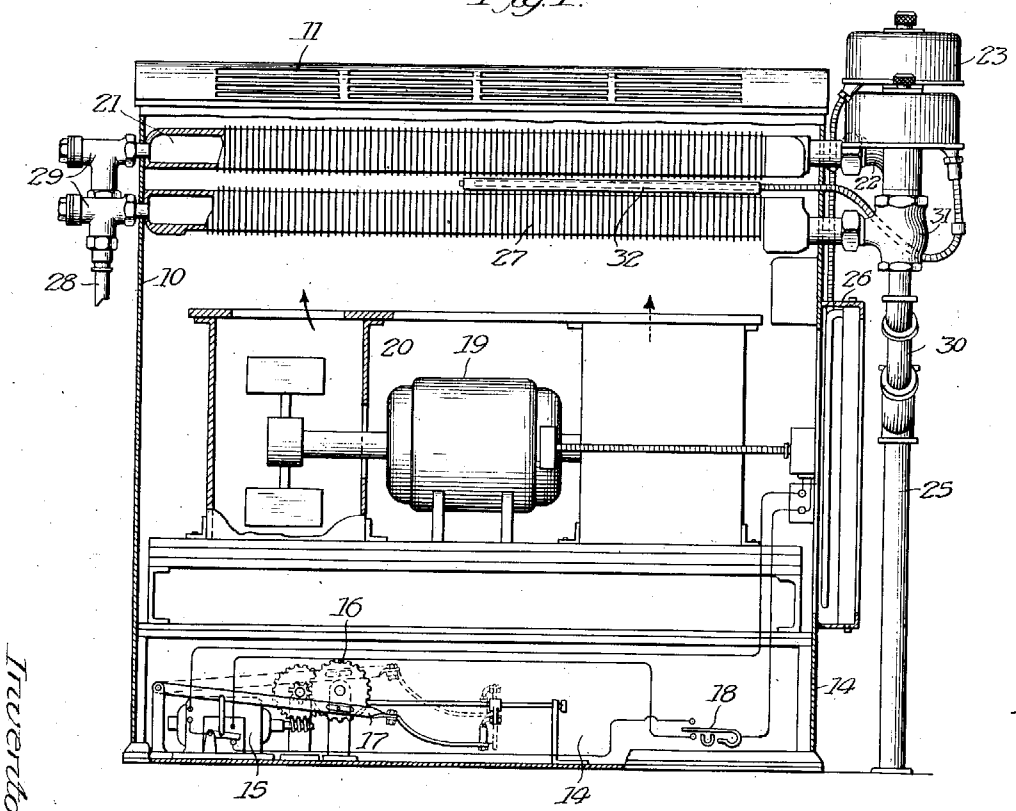

The invention will be more readily understood by reference to the accompanying drawing, in which:

Fig. 1 is a sectional view on the line 1—1 of Fig. 2 showing apparatus arranged in accordance with my invention, and Fig. 2 is an end view of the apparatus shown in Fig. 1.

In the drawing I have illustrated a sheet metal casing or cabinet 10 having air outlet openings 11 in its top and two air inlet openings 12—13 near the bottom and preferably on opposite sides of the casing. The screened opening 12 is designed to admit air to the casing from the room to be heated, while the opening 13 admits air from the outside. The admission of air from one or the other of the openings 12—13 is controlled by a damper 14 adapted to be oscillated by a motor 15, through speed reducing means 16 and an arm 17 under the control of a thermostat 18 preferably located as shown in the inlet opening 12 at a point near the lower end of the casing. The thermostat 18 is set so that whenever the temperature of the room near the floor is below a predetermined point, say 65 degrees, the damper will be swung from the full line position of Fig. 2 to the dotted line position. This will result in circulation of the air in the room until the temperature is raised to the required point; when the temperature reaches that point the position of the damper will be reversed and air admitted through the opening 13.

A motor 19 having a fan 20 on each of the overhung ends of the armature shaft provides means for inducing a flow of air through the casing. This motor is intended for constant operation throughout the period when heating and ventilating are to be effected.

In the upper part of the casing is a heat exchange element 21 the admission of steam to which is controlled by a valve 22 actuated by a well known form of self-contained thermostat consisting of a bellows within the housing 23, a flexible tube 24 and a bulb 25. The bulb is mounted in a space between walls 26 that define an opening into the casing. A small space remains between the sides of the bulb and the walls 26 through which air from the room is drawn into the casing.

The apparatus just described is a duplicate of that described in my copending application filed May 5, 1930.

In the modified construction of this application, I provide a second radiator 27 preferably located immediately beneath the radiator 21, both radiators having a common exhaust pipe 28 through the check valve 29. Steam is supplied to radiator 27 through a branch 30 from the supply pipe to the radiator 21 the valve 31 to the radiator 27 being actuated by a self-contained thermostat such as already described, the bulb 32 of which is placed between the two radiators and immediately above the radiator 27.

By reason of this arrangement it will at no time be possible to discharge air into the room at a temperature lower than the predetermined setting of the thermostat 32; in other words, regardless of the temperature of the room, it will be possible to heat the incoming air to a predetermined temperature, say 65 degrees before admitting it. This may result in the elevation of the temprature of the room to a certain extent, but it will avoid the discharge of volumes of objectionable cold air.

Obviously the construction is capable of considerable modification and I do not wish to be limited except as indicated in the appended claims.

I claim:

1. In combination, a casing having an upper air-outlet opening and two air-inlet openings, one of the latter being connected to the space the temperature of which is to be controlled and the other connected to a space outside of said temperature-controlled space, a pair of independent heat exchange elements in said casing, a thermostat for controlling the admission of air to said casing either from the inside or outside spaces, a second thermostat for controlling the admission of heat to the lower of said heat exchange elements according to the temperature of the space between the superposed heat exchange elements, and a third thermostat mounted in the space the temperature of which is to be finally controlled, and controlling the admission of heat to said upper heat exchange element according to the temperature of the air in said temperature controlled space.

2. In combination, a casing having an air-outlet opening and air-inlet openings one of said inlet openings being open to the room and the other inlet opening being connected to the outside air, two independent radiators in said casing, a thermostat for controlling the admission of air to said casing either from the room or from the outside, a blower for causing travel of air through said casing, a second thermostat for controlling the admission of heat to one of said radiators, according to the temperature of the space immediately above said radiator, and a third thermostat responsive to the temperature of the room for controlling the admission of heat to the other radiator.

3. In heating and ventilating apparatus, the combination of self-contained device comprising a casing having an air outlet opening and air inlet openings one of the latter connected to the room, the temperature of which is to be controlled, and the other inlet opening being connected to the outside air, two independent superposed radiators in said casing a blower in said casing, means for controlling the admission of air to said casing from the room or outside according to the temperature of the room, means for controlling admission of heat to the lower of said radiators according to the temperature at a point immediately above said radiator, and means for controlling the temperature of the upper radiator according to the desired room temperature.

4. In heating and ventilating apparatus, the combination of self-contained device comprising a casing having an air outlet opening and air inlet openings, one of the latter connected to the room, the temperature of which is to be controlled, and the other inlet opening being connected to the outside air, two independent superposed radiators in said casing, a blower in said casing, means for controlling admission of heat to the lower of said radiators according to the temperature at a point immediately above said radiator, said means being set at a temperature lower than the desired temperature of the room, and means for controlling the temperature of the upper radiator according to the desired room temperature.

5. In heating and ventilating apparatus, the combination of a casing having an outlet and air inlet openings one of the latter connected to the room, the temperature of which is to be controlled and the other merely being connected to the outside air, independent superposed radiators within said casing, means for inducing travel of air through said casing, thermostatic means for controlling the admission of air to the casing from the room or outside according to the temperature of the air at a point near the bottom of said casing, a second thermostat for controlling the admission of heat to the lowermost radiator according to the temperature at a point immediately above said radiator, and a third thermostat responsive to the air temperature of the room for controlling the admission of heat to an upper radiator.

6. In heating and ventilating apparatus, the combination of a self-contained device comprising a casing having an air outlet opening and air inlet openings, one of the latter connected to the room, the temperature of which is to be controlled, and the other inlet opening being connected to the outside air, two independent superposed radiators in said casing, a blower in said casing, means for controlling admission of heat to the lower of said radiators according to the temperature of the air after it passes said lower radiator, and means for controlling the temperature of the upper radiator according to the desired room temperature.

7. In heating and ventilating apparatus, the combination of a self-contained device comprising a casing having an air outlet opening and air inlet openings, one of the latter connected to the room, the temperature of which is to be controlled, and the other inlet opening being connected to the outside air, two independent superposed radiators in said casing, a blower in said casing, means for controlling admission of heat to one of said radiators according to the temperature at a point immediately above said radiator, said means being set at a temperature lower than the desired temperature of the room, and means for controlling the temperature of the other radiator according to the desired room temperature.

8. In combination, in a heating and ventilating apparatus, a pair of radiators arranged in adjacent vertically spaced relationship, valves for each of said radiators, thermostatic means located between said radiators for controlling the valve of one radiator, and thermostatic means located remote from said radiators controlling the valve of the other radiators.

9. The method of heating an enclosed space which consists in introducing fresh air or recirculated air therein, according to the temperature of said space, maintaining the temperature of the introduced air at a predetermined point immediately after it passes a heat exchange element, and then applying additional heat to said air after it passes said heat exchange element if required to bring the temperature up to the required temperature of said enclosed space.

10. The method of heating an enclosed space which consists in automatically selecting the introduction therein of fresh air or air withdrawn from said space according to temperature conditions, maintaining the temperature of the introduced air at a predetermined degree after it passes a heat exchange element, said temperature being lower than the desired temperature of the enclosed space, and then applying additional heat to said air after it passes said heat exchange element according to the temperature of said enclosed space.

In testimony whereof, I have affixed my signature.

MORTON O. SNEDIKER.